United States Patent [19]

Canterino et al.

[11] 4,439,260
[45] Mar. 27, 1984

[54] METHOD AND APPARATUS FOR FORMING CROSS-LAMINATED THERMOPLASTIC FILM

[75] Inventors: Peter J. Canterino, Towaco; Craig E. Allen, Clark, both of N.J.

[73] Assignee: Mobil Oil Corporation, New York, N.Y.

[21] Appl. No.: 378,705

[22] Filed: May 17, 1982

[51] Int. Cl.³ ............................................. B32B 31/02
[52] U.S. Cl. .............................. 156/259; 156/244.14; 156/244.18; 156/244.24; 156/260; 156/264; 156/272.8; 156/379.6; 156/510; 156/512
[58] Field of Search .............. 156/243, 244.11, 244.13, 156/244.14, 244.18, 244.24, 156, 254, 259, 260, 264, 271, 272.8, 379.6, 510, 512

[56] References Cited

U.S. PATENT DOCUMENTS

| | | | |
|---|---|---|---|
| 3,265,552 | 8/1966 | Berggren et al. | 156/264 |
| 3,322,613 | 5/1967 | Rasmussen | 161/234 |
| 3,340,124 | 9/1967 | Lowe et al. | 156/271 |
| 3,342,657 | 9/1967 | Dyer | 156/244.18 |
| 3,467,565 | 9/1969 | Utz | 156/259 |
| 3,471,353 | 10/1969 | Rasmussen | 156/308 |
| 3,496,059 | 2/1970 | Rasmussen | 161/146 |
| 3,758,370 | 9/1973 | Sakurai et al. | 156/259 |
| 4,011,128 | 3/1977 | Suzuki | 156/244.13 |
| 4,062,712 | 12/1977 | Stark | 156/244 |

FOREIGN PATENT DOCUMENTS 660576 3/1965 Belgium .
1071085 6/1967 United Kingdom .

*Primary Examiner*—Caleb Weston
*Attorney, Agent, or Firm*—A. J. McKillop; M. G. Gilman; J. F. Powers, Jr.

[57] ABSTRACT

A method and apparatus for the forming of cross-laminated thermoplastic film, particularly from a supply roll of a layflat, highly melt-oriented tubular thermoplastic film. The layflat tubular film is advanced while concurrently being rotated about its longitudinal axis to thereby generate a compound linear and rotary motion, inflated and slit by a heated wire or laser beam on a bias to provide at least two layers of film strips which are adapted to be superimposed and laminated with the orientation of one layer being biased relative to the other layer so as to provide a cross-laminated thermoplastic film evidencing high strength in both the machine direction and the transverse direction of the film web.

20 Claims, 2 Drawing Figures

METHOD AND APPARATUS FOR FORMING CROSS-LAMINATED THERMOPLASTIC FILM

BACKGROUND OF THE INVENTION

1. Field of the Invention

The present invention relates to a method for the forming of cross-laminated thermoplastic film, particularly from a supply roll of a layflat, highly melt-oriented tubular thermoplastic film, and to an apparatus for implementation of the method.

Generally, in methods relating to the extrusion of tubular thermoplastic films, which may be melt-oriented during extrusion thereof, the thermoplastic film evidences a relatively high strength in a monoaxial direction, in essence in the machine direction while the film will, in general, have a substantially lower strength in the other film direction. In order to provide a thermoplastic film which evidences desirable strength characteristics in more than one direction, subsequent to the extrusion of the film, the extruded film may be slit along a bias and then laminated with a film ply which is oriented in a different direction so as to provide a strong cross-laminated film evidencing the desired strength in both the machine direction and the transverse direction of the film.

Frequently, the foregoing method is effected by slitting webs of thermoplastic film along a bias and then superimposing the film web on another web with the interposition of a pressure-sensitive adhesive so as to formulate a biaxially or cross-laminated film which evidences superior strength in various directions.

2. Discussion of the Prior Art

The formation of cross-laminated thermoplastic film is, to a considerable extent, currently known in the technology. Thus, Dyer U.S. Pat. No. 3,342,657 and British Pat. No. 1,071,085 each disclose a process and apparatus for producing a cross-laminated thermoplastic film, in which a tubular film of a monoaxially oriented thermoplastic polymeric material is extruded through a rotating die, stretched while being passed between rotating mandrels, and slit while being advanced through the interposition of stationary knives into separate strips of film which are then adhered together to provide a cross-laminated film web. The prior art process and apparatus provides essentially for an extruder with a rotating die, a zone for stretching the extruded tube which incorporates a cooling mandrel, and a second tube-drawing device with a heating mandrel capable of heating the tube to its orientation temperature and with a second cooling mandrel downstream along the path of travel of the tubular film. This clearly is not the instance in the present method and apparatus in which the tubular film is highly melt-oriented during the extrusion and, consequently, it does not require the type of processing and apparatus contemplated in these patents.

Stark U.S. Pat. No. 4,062,712 discloses an extruded tubular film which is slit into separate film strips by a method employing a stationary slitting device, such as cutting knives, and is thereafter laminated with the interposition of a central layer of a high-density polyethylene in order to provide a high-strength packaging laminate. There is no utilization of a roll of a layflat tubular extruded thermoplastic film which has been previously highly melt-oriented during extrusion, and which allows for slitting into separate film strips which are subsequently laminated to provide a cross-laminated film packing of a thermoplastic material which evidences high strength in both the machine direction and transverse direction of the film.

Similarly, Rasmussen U.S. Pat. Nos. 3,322,613; 3,471,353 and 3,496,059 disclose cross-laminated thermoplastic film materials wherein superimposed layers of film which are oriented in one particular specific direction are superimposed on and laminated to other film layers to provide a high strength cross laminated film. The Rasmussen U.S. patents do not employ thermoplastic films which are oriented in the melt during extrusion of the film. Rasmussen discloses rotating dies, heating and cooling mandrels, and rotating nip rolls, wherein the only similarity with the present invention resides in the utilization of stationary slitting knives. Moreover, the thermoplastic film product obtained in Rasmussen differs considerably in its properties from that of the present invention. Moreover, Rasmussen does not utilize air to inflate a layflat tubular extruded film in order to formulate the cross-laminated film web.

Other cross-laminated films which are known in the art are sold under the trademark "Valeron" by the Van Leer Plastics Inc. wherein two plies of a monoaxially oriented film are cut and laminated together. The layers are combined upon lamination with the strong direction of one layer crossing the weak direction of the other so as to impart equal strength in all directions to the resultant film web.

Another commercial cross-laminated high-density polyethylene film is produced by Mitsubishi Petrochemical Company, Japan, under the socalled "Sudex" process.

SUMMARY OF THE INVENTION

Consequently, in order to obviate the limitations encountered in the prior art in the formation of cross-laminated webs of film produced from a highly melt-oriented tubular thermoplastic film, the film is prepared by extruding, or coextruding with a lower-melting resin, a partially crystalline thermoplastic resin, and by a blown film process, highly drawing down the melt to impart a high orientation to the film in the machine direction. The present invention contemplates the provision of a method and apparatus in which a layflat tubular film is advanced while concurrently being rotated about its longitudinal axis to thereby generate a compound linear and rotary motion, inflated and slit on a bias to provide at least two layers of film strips which are adapted to be superimposed and laminated with the orientation of one layer being biased relative to the other layer so as to provide a cross-laminated thermoplastic film evidencing high strength in both machine direction and the transverse direction of the film web.

Accordingly, it is an object of the present invention to provide a method for the formation of a strong cross-laminated thermoplastic film web from a layflat tube of an extruded, highly melt-oriented plastic film material.

It is another object of the present invention to provide an apparatus for the implementation of the above-mentioned method for forming a cross-laminated thermoplastic film web.

A more specific object of the present invention lies in the provision of a novel method and apparatus for the formation of a cross-laminated thermoplastic film from a layflat supply roll of extruded tubular plastic film, wherein the tubular film is advanced over a mandrel while being concurrently rotated, and is inflated into an expanded tubular configuration which it is generally self-sustaining, and while advancing is slit into separate film strips in which the film orientation of each strip is biased relative to the other strip so that upon superposition, the strips are adapted to be laminated into a strong cross-laminated thermoplastic film web possessing high strength in both the machine direction and transverse direction of the film web.

BRIEF DESCRIPTION OF THE DRAWINGS

Reference may now be had to the following detailed description of exemplary embodiments of an apparatus for implementing the method of the invention, taken in conjunction with the accompanying drawings; in which.

DETAILED DESCRIPTION

Figure 1:
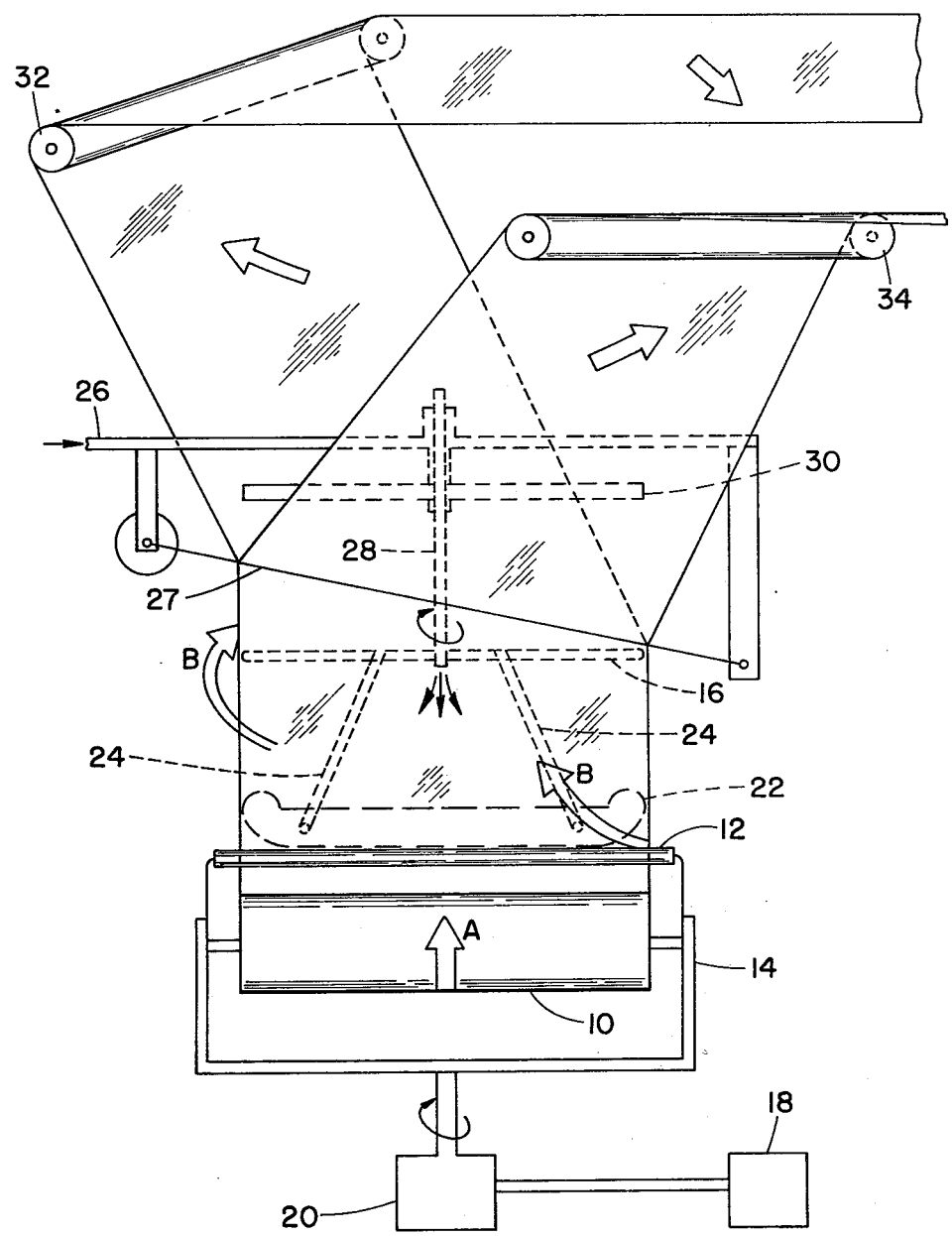
FIG. 1 illustrates generally diagrammatically a first embodiment of an apparatus for forming a strong cross-laminated thermoplastic film from an extruded tubular melt-oriented film.

Referring now in detail to the apparatus as disclosed in FIG. 1 of the drawings, a film supply 10 supports a layflat tubular film of thermoplastic material, which has been highly melt-oriented during the extrusion thereof. The film may be constituted of a suitable polyolefin such as, for example, high density polyethylene or polypropylene and, if desired, coextruded with an outer film layer of EVA, LDPE, or other lower-melting plastic. The film is advanced in the direction of arrow A so as to pass between a pair of cooperating nip rolls 12 which extend in parallel with the film supply roll 10 and are journaled on a common frame arrangement 14 supporting the supply roll 10 and the nip rolls 12.

Located within the tubular film at some distance from the nip rolls 12 along the path of advancement of the tubular film, is a disk-like mandrel 16 which is supported to be freely rotatable and adapted to be rotated by the film web rotating thereabout. The film web is rotated in the direction of arrows B concurrent with its longitudinal advance in the direction of arrow A by means of rotation which is imparted to the supply roll 10 and nip rolls 12 from a drive motor 18 which turns the frame 14 through a suitably interposed gear box 20. This compound motion, in effect, the combined rotation and advancement of the film, will impart a predetermined bias of the film orientation relative to the machine direction. By varying the relative speeds of rotation and advancement there can be changed the bias of the film orientation, for example, to an angle of between about 20° to 40° with respect to the orientation in the machine direction.

The layflat tubular film, as it is being advanced from the nip rolls 12 towards the rotatable disk-like mandrel 16, is opened up by a "banana shaped" spreader bar 22 arranged within the tubular film in coaxial relationship with the rotating axis of frame 14, and wherein the spreader bar 22 is connected to the mandrel 16 by support struts 24. The spreader bar 22 may be constructed of metal which is coated with polytetrafluoroethylene in order to provide an extremely low friction surface in contact with the interior of the plastic tubular film material sliding past the spreader bar. The opened tubular film is blown up into an expanded tubular configuration by supplying air from a suitable source (not shown) through air supply conduits 26 and 28 of which the latter extends through the rotatable mandrel 16 to convey air into the tubular film in the zone between the nip rolls 12 and the mandrel 16. The nip rolls 12 serve to "pay off" film in the same position relative to the mandrel 16 and concurrently preclude the flow of air back to the supply roll which supports the layflat tubular film.

Located at a predetermined angle relative to the path of advancement of the expanded tubular film above the mandrel 16 is a slitting device which, in this embodiment, consists of a heated metal wire 27 extending across the path of movement of the tubular film web so as to cause the tubular film to be slit during its advance into separate strips of film, wherein the plastic material in each film strip is oriented along the direction of the indicated arrows. The metal wire 27 may be an electrically-heated nickel-chromium wire. Alternatively, in lieu of the heated metal wire 27, the slitting device may consist of the slitting knives which, if desired, may also be heated by a suitable heating source. In order to prevent any inadvertent contact between the separated film strips or components of the apparatus, a stationary separator disk 30, which is preferably coated with a low friction material, may be interposed between the film strips downstream of the slitting device. Each separate strip of film is passed over, respectively, a rotatable idler roll 32 and 34, which provide for the required advancing of the film strips. From the idler rolls 32, 34 each of the film strips is advanced to a suitable apparatus (not shown) such as a laminating station and a turret winder, where the strips may be superimposed so as to form a high-strength, cross-laminated film web.

Figure 2:
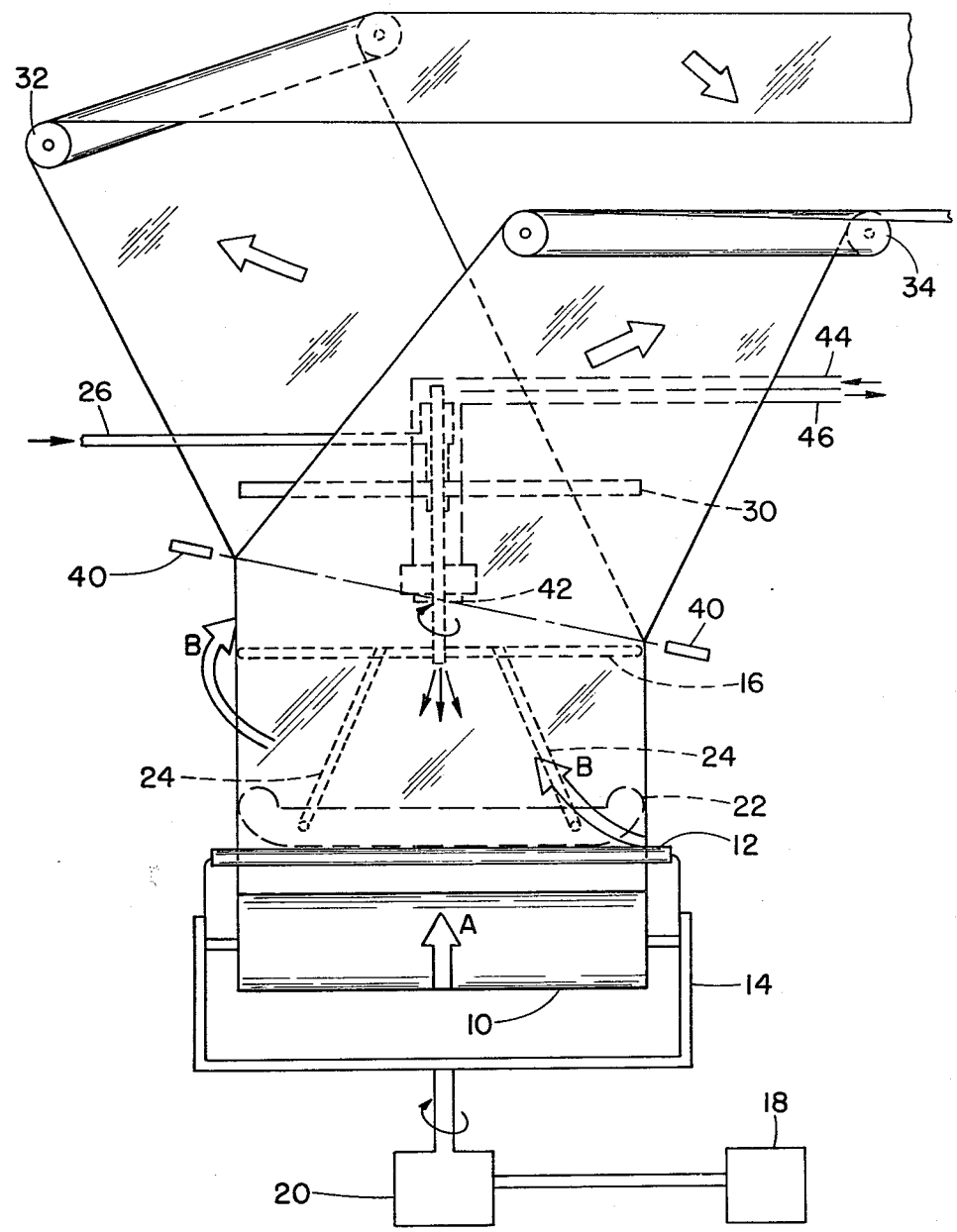
FIG. 2 illustrates a second embodiment of an apparatus for forming the cross-laminated film web.

The apparatus in the embodiment of FIG. 2 is substantially similar to that of FIG. 1, in which like or similar elements are identified by the same reference numerals, with the primary distinction being that, in lieu of the heated wire 27 in FIG. 1, in this embodiment the tubular web of thermoplastic film is slit into strips by the intermediary of a laser beam which is generated from a suitable laser arrangement 40. In this instance, a laser beam is projected at a predetermined angle or bias relative to the advance of the film across the path of movement of the advancing and rotating tubular film. A suitable heat sink 42 for taking up energy of the laser, which is supplied by a water cooling medium through inlets and outlets 44, 46 for internal cooling, is located in the path of the laser beam extending across the tubular film.

Through the utilization of the inventive method and apparatus there is thus provided a cross-laminated thermoplastic film which evidences superior physical properties in comparison with films produced in accordance with the prior art, as set forth hereinabove. Thus, for example, in the following table there are listed comparative data relating to the properties of the inventive film laminate in comparison with those of the prior art.

| PROPERTIES OF CROSS LAMINATED FILMS | | | | |
| --- | --- | --- | --- | --- |
| Properties | | Canterino et al.[a] | Valeron[b] | Rasmussen[c] | Sudex[d] |
| Film Gauge | mils | 0.9–1.2 | 1.75 | 4.6 | 5 |
| Tensile Strength | MD | 6.5 | 8.6 | 9.7 | 4.7 |
| (psi) × 10³ | TD | 3.1 | 8.9 | 6.0 | 3.4 |
| Yield Strength | MD | 4.3 | 4.0 | 4.4 | 3.2 |
| (psi) × 10³ | TD | 3.1 | 3.7 | 3.0 | 2.8 |
| % Elongation | MD | 410 | 360 | 515 | 592 |
| at break | TD | 380 | 316 | 420 | 105 |

-continued

PROPERTIES OF CROSS LAMINATED FILMS

| Properties | | Canterino et al.[a] | Valeron[b] | Rasmussen[c] | Sudex[d] |
|---|---|---|---|---|---|
| Elmendorf Tear | MD | 101 | 78 | >425 | 105 |
| g/mil | TD | 914 | 156 | >500 | 143 |
| Angle from MD | 30° | 637 | 181 | — | — |
| Tensile Modulus | MD | 108 | 86.7 | 70.00 | 71.0 |
| (psi) × 10³ | TD | 94.0 | 72.3 | 46.00 | 76.0 |

[a]Cross laminated, bias slit HDPE/EVA film, melt-oriented
[b]Commercial cross-laminated HDPE film - Van Leer (Valeron)
[c]Experimental laminate of polypropylene film.
[d]Commercial cross-laminated PE film - Mitsubishi Petrochemical (Sudex Process).

Other modifications of the inventive apparatus also suggest themselves to one skilled in the art. Thus, although the mandrel 16 has been described as being rotatable in conformance with the rotation of the advancing tubular film, obviously the mandrel may be stationary when constructed with a low friction coating, such as polytetrafluoroethylene.

Although the inventive method and apparatus has been described in connection with the formation of two strips of film from the tubular thermoplastic film, it becomes readily apparent that by providing more than one slitting device, such as two wires 27 at 90° to each other, or a plurality of slitting knives spaced about the circumference of the tube, or with intersecting laser beams; three, four or even a larger number of separate film strips may be slit from the single tubular film so as to provide a multiple-ply, cross-laminated film. Moreover, by providing coextruded thermoplastic films, such as an HDPE/EVA film, with the provision of multiple film strips there may be formed a laminate constituted of a plurality of plies, wherein the laminated film web includes a number of plies alternatingly constituted of HDPE and of EVA film strips. This concept may also be utilized in connection with different types of thermoplastic materials, particularly higher melting polyolefins in which, if a coextruded film is utilized, the interior layer conceivably would have a lower melting point and the outer layer would be constituted of a higher melting polyolefin. When the film is a coextruded composite, it is laminated with heat and pressure face to face with a lower-melting component at a heat and pressure sufficient to obtain tack adhesion but not complete melting on the inner layer.

From the foregoing it clearly appears that the present invention provides for a simple slitting apparatus and method for tubular thermoplastic films in order to provide strips laminatable into cross-laminated films webs having high strength both in the machine direction and in the transverse direction.

While there has been shown and described what are considered to be preferred embodiments of the invention, it should be understood that variations in form and detail could readily be made without departing from the spirit of the invention. It is therefore intended that the invention be not limited to the exact form and detail shown herein and described, nor to anything other than the whole of the invention as hereinafter claimed.

What is claimed is:

1. A method for forming a continuous cross-laminated, bias-slit web from a supply roll of a layflat, highly machine direction oriented tubular thermoplastic film comprising the steps of:
   (a) advancing the tubular film over a mandrel in the longitudinal direction of the film while concurrently rotating said supply roll about a rotation axis perpendicular to an axis of said roll, thereby imparting rotation to said film without molecularly orienting it;
   (b) inflating said tubular film intermediate said supply roll and said mandrel to a pressure preventing collapse of said film;
   (c) slitting said tubular film downstream of said mandrel at a predetermined bias relative to the movement thereof providing at least two film strips adapted to be superimposed to form said continuous laminated web, said steps (a), (b) and (c) being performed in a manner which does not change the molecular orientation inherent in said tubular film, but which produces in said two strips slit from said tubular film a molecular orientation which has components in both the machine and transverse direction, with the molecular orientation in one of said strips crossing that in the other of said strips; and
   (d) laminating said two strips together so that the molecular orientation of one crosses the molecular orientation of the other to form a cross-biased laminated film.

2. A method as claimed in claim 1, comprising slitting said tubular film with at least one heated metal wire extending across the path of movement of said film.

3. A method as claimed in claim 1, comprising slitting said tubular film with at least one laser beam extending across the path of movement of said film.

4. A method as claimed in claim 1, comprising slitting said tubular film with knives intersecting the path of movement of said film.

5. A method as claimed in claim 1, comprising conducting a supply of air into said tubular film through said mandrel for inflating said film.

6. A method as claimed in claim 1, comprising positioning film separating means downstream of slitting said tubular film to prevent inadvertent contact between the slit film strips.

7. A method as claimed in claim 1, comprising conducting said slit film strips over take-up rolls to control the advancing speed of said tubular film.

8. A method as claimed in claim 1, wherein said thermoplastic film comprises an HDPE-EVA melt-oriented film.

9. An apparatus for forming a continuous cross-laminated, bias-slit web from a supply roll of a layflat, highly machine direction oriented tubular thermoplastic film; comprising a mandrel; means for advancing said tubular film from said supply roll over said mandrel; means for concurrently rotating said supply roll about a rotation axis perpendicular to an axis of said supply roller to impart rotation to said advancing tubular film without molecularly orienting it; means for inflating said tubular film intermediate said supply roll and said mandrel; means downstream of said mandrel for slitting said advancing tubular film at a predetermined bias relative to the film movement to provide at least two film strips adapted to be superimposed to form said continuous laminated web, said advancing means, rotating means and slitting means operating in a manner which does not change the molecular orientation inherent in said tubular film, but which produces in said two strips slit from said tubular film a molecular orientation which has components in both the machine and transverse direction, with the molecular orientation in one of said strips crossing that in the other of said strips; and means for laminating said two strips together so that the molecular orientation of one crosses the molecular orientation of the other to form a cross-biased laminated film.

10. An apparatus as claimed in claim 9, said slitting means comprising at least one heated metal wire extending across said tubular film.

11. An apparatus as claimed in claim 10, said metal wire comprising an electrically-heated nickel-chromium wire.

12. An apparatus as claimed in claim 9, comprising means for supplying air into said tubular film through said mandrel; and nip rolls engaging said film proximate said supply roll to stop the flow of air therepast and advance said film in the same position relative to said mandrel.

13. An apparatus as claimed in claim 12, comprising spreader bar means in said tubular film adjacent said nip rolls supported from said mandrel to initially spread apart said layflat tubular film.

14. An apparatus as claimed in claim 9, said mandrel being freely rotatable within said tubular film.

15. An apparatus as claimed in claim 9, comprising separator disk means located downstream of said slitting means to prevent inadvertent contact between the separated film strips.

16. An apparatus as claimed in claim 9, said slitting means comprising at least one laser beam extending across said tubular film.

17. An apparatus as claimed in claim 16, comprising heat sink means connected to a heat exchanger for said laser beam.

18. An apparatus as claimed in claim 9, said film advancing means comprising idler rolls for said slit film strips to advance said film strips towards a laminating station.

19. An apparatus as claimed in claim 9, said slitting means comprising a plurality of slitting knives intersecting the path of movement of said tubular film.

20. An apparatus as claimed in claim 9, said tubular film comprising a coextruded composite formed of a lower-melting resin and a partially crystalline thermoplastic resin.

* * * * *